No. 670,056. Patented Mar. 19, 1901.
G. R. McGINNIS.
CHECK ROW CORN PLANTER.
(Application filed Sept. 17, 1900.)
(No Model.) 2 Sheets—Sheet 1.
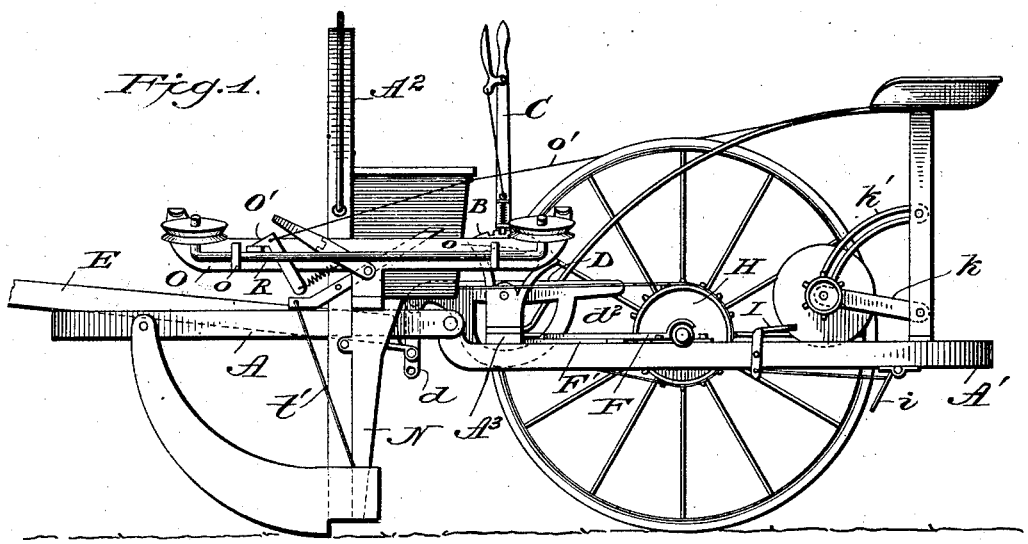
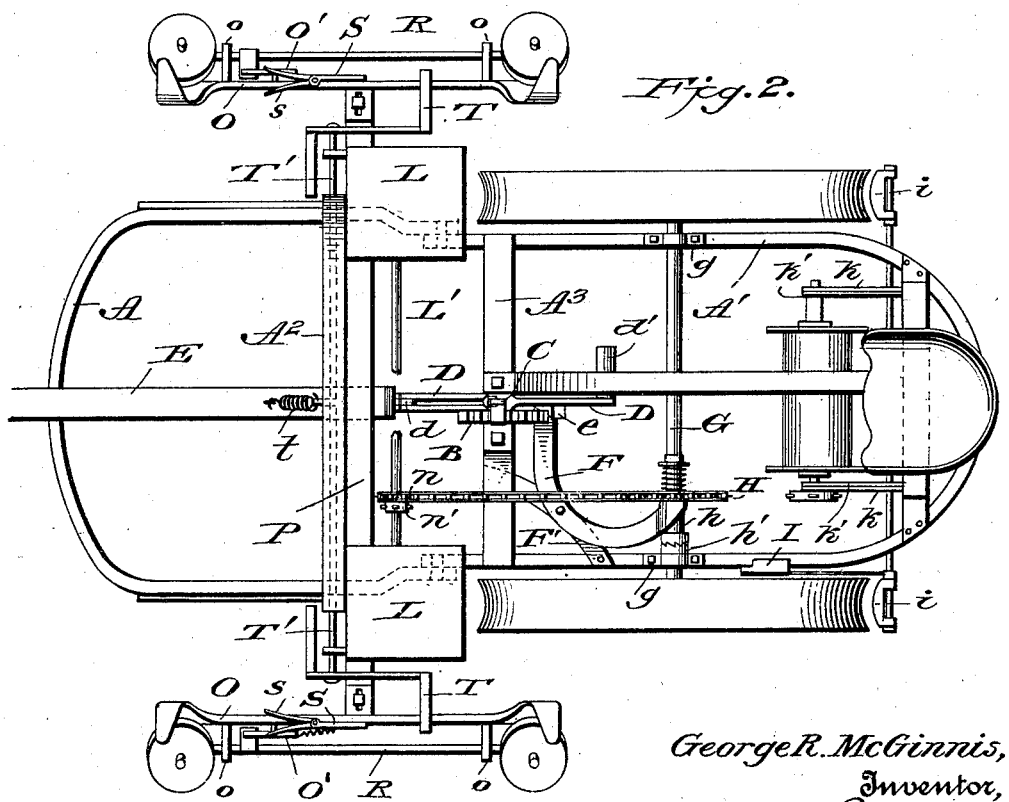
George R. McGinnis,
Inventor,
by Eugene W. Johnson
Attorney
Witnesses
G. S. Elliott.
H. H. Johnson.

No. 670,056. Patented Mar. 19, 1901.
G. R. McGINNIS.
CHECK ROW CORN PLANTER.
(Application filed Sept. 17, 1900.)
(No Model.)  2 Sheets—Sheet 2.
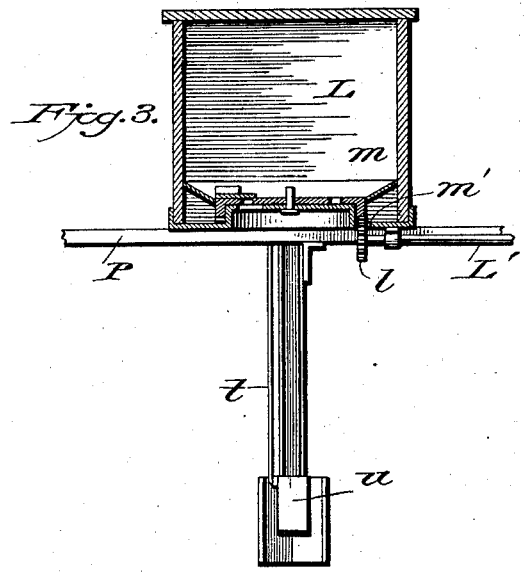
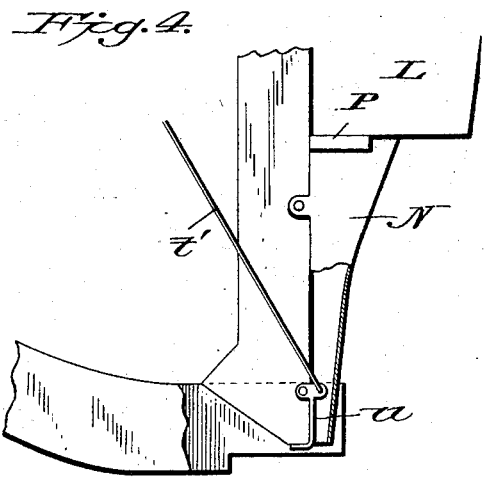
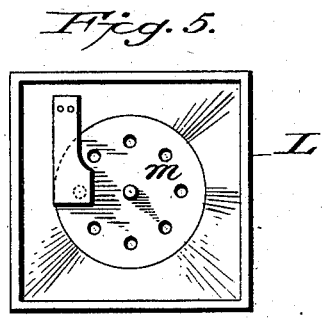
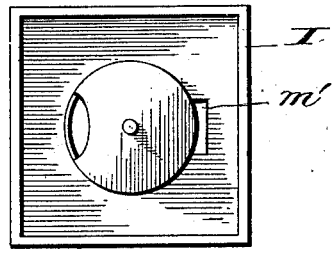
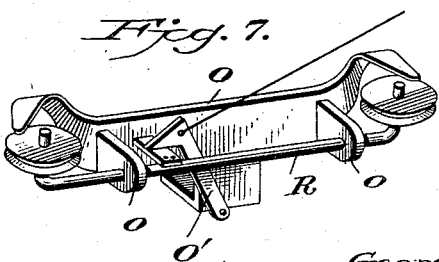
George R. McGinnis,
Inventor,
Witnesses
G. S. Elliott.
H. H. Johnson
by Eugene W. Johnson
Attorney

UNITED STATES PATENT OFFICE.

GEORGE R. McGINNIS, OF ARGENTA, ILLINOIS.

CHECK-ROW CORN-PLANTER.

SPECIFICATION forming part of Letters Patent No. 670,056, dated March 19, 1901.

Application filed September 17, 1900. Serial No. 30,299. (No model.)

*To all whom it may concern:*

Be it known that I, GEORGE R. McGINNIS, a citizen of the United States, residing at Argenta, in the county of Macon and State of Illinois, have invented new and useful Improvements in Check-Row Corn-Planters, of which the following is a specification.

This invention relates to certain new and useful improvements in check-row corn-planters; and it consists in the construction and combination of the parts, as will be hereinafter set forth, and pointed out in the claims, the improvements being designed more particularly as improvements upon my prior patents, No. 426,947, dated April 29, 1890, and No. 522,381, dated July 3, 1894.

In the accompanying drawings, Figure 1 is a side elevation of a check-row corn-planter constructed in accordance with my invention. Fig. 2 is a plan view. Fig. 3 is a vertical transverse section taken through one of the seedboxes in rear of runner. Fig. 4 is a side elevation, partly in section, of a portion of the runner-frame. Figs. 5 and 6 are plan views showing the seed cut-offs, which are located within the seedboxes; and Fig. 7 is a detail perspective view of the guides for the check-row cord.

The main frame of the planter is made up of two horizontally-disposed arched frames A A', designated, respectively, as the "front" and "rear" frames. The front frame A has its end members bent to approach each other and admit of a narrower rear frame being utilized, the front and rear frames being pivotally connected to each other, as shown. To the front frame A, forward of the seedboxes, there is secured an arched frame $A^2$, which is maintained at right angles with the front frame, and the end members extend downward to provide for the attachment thereto of the seed-spouts and runners, and to the upper or arched portion of this frame $A^2$ there is secured a bar upon which may be mounted suitable fixtures for connecting thereto and shifting from one side of the planter to the other side a marker-bar, which may be of ordinary construction. The rear frame A' is provided at its front with upturned ends, which are bolted or pivotally connected to the rear ends of the front frame, and said rear frame has connected thereto a cross-bar $A^3$, upon which is mounted a toothed segment B, said toothed segment having pivoted below the teeth thereof the lower end of a hand-lever C, which carries a spring-actuated bolt for engagement with the teeth of the segment, and upon the same bolt that attaches the hand-lever to the toothed segment is secured a foot-lever D, which is shaped so that the cross-bar $A^3$ can pass through the same. The forward portion of the foot-lever is divided, and to the front end of said divided portion is pivoted a link $d$, which also engages with a plate attached to the rear end of the tongue E. The rear end of the foot-lever is provided with a laterally-extended portion $d'$, which serves as a foot-rest, so that both hand and foot power may be utilized when it is desired to change the angle of the front frame with respect to the rear frame, and when adjusted the bolt on the hand-lever engaging the segment will hold the frames in the position to which they have been set. The curved portion $d^2$ of the foot-lever D may be bent to provide, when viewed vertically, a laterally-extended portion having an inclined surface, or there may be secured thereto a block $e$, with an inclined face, which face is intended to engage the inner beveled end of a curved bar F, which bar is pivoted upon a brace F', mounted on the cross-bar $A^3$ and upon one of the side pieces of the rear frame. The opposite end of the curved bar F engages with the sleeve of a clutch to throw the driving mechanism which actuates the seed-dropping mechanism within the seedboxes out of gear. It will therefore be noted that the operation or movement of either the hand or foot lever, which are connected to operate in unison, not only adjusts the runner-frame, but also operates the clutch. The link $d$ between the foot-lever and the plate attached to the rear end of the tongue may have several perforations, so that the angle of the runner-frame with respect to the rear frame can be varied, so that the heels of the runner-frames can be caused to enter the soil to the desired depth.

The axle G, to which the supporting and covering wheels are made fast, is maintained in place by boxings $g \, g$, secured to the upper edge of the rear frame, and this axle has loosely mounted thereon a sprocket-wheel H, the sleeve being forced in one direction spring which bears against the sprocket-wheel and against a collar secured to the axle. On the other side of the sprocket-wheel from the spring the sleeve $h$ is constructed to present a serrated or clutch face, and the sleeve is engaged by the curved bar F to move the same out of engagement with the clutch-face $h'$, which is rigidly keyed upon the axle, and by such construction it will be noted that when the curved bar F has its beveled end moved forward the clutch-faces will be disconnected, so that the sprocket-wheel may turn freely on the axle.

$i\ i$ refer to scrapers for the supporting and covering wheels, which are pivoted upon a bar carried by the rear frame, the scrapers being moved toward and into engagement with the covering-wheels by a foot-lever I.

The driver's seat is supported in any suitable manner, and adjacent thereto is mounted a spool for the purpose of carrying the check-row cord, which spool is mounted on arms $k$, pivoted to the rear seat-supports, and the shaft which passes through the spool not only engages with the arms $k\ k$, but also with segmental arms $k'$, which are slotted, means being provided on the shaft for exerting a tension and maintaining the spool at any desired inclination. One end of the spool may have a sprocket-wheel or other equivalent means for turning the shaft and spool when it is desired to wind the check-row cord thereon.

The seedboxes L L are suitably secured to the arched frame $A^2$, and to the under side of the seedboxes there is secured a shaft L', having at its ends gear-wheels $l$, which engage with the inverted crown-teeth of the perforated disks $m$ within the seedboxes, said seedboxes having resilient plates which extend over one of the perforations in the plates. The shaft L' is provided, approximately in line with the sprocket-wheel H, with sprocket-wheels $n\ n'$ of different diameters, so that by shifting the chain which passes over the sprocket-wheel H from one of the sprockets $n$ to the smaller sprocket $n'$ the movement of the feed-disk $m$ in the seedbox may be increased in order to drop a greater number of kernels of corn into the seed-spouts. Beneath the perforated disks $m$ is located the bottoms of the seedboxes, which have raised portions, which are cut away to admit the seed to the seed-spout, and adjacent to the raised portion are openings $m'$, through which pass the gear-wheels $l$, which engage the inverted crown-teeth on the perforated disks $m$.

The seed-spouts N are connected to the rear vertical portion of the arch-frame $A^2$ and terminate near the end of the runners. The seed-spouts are made up of thin sheet metal, which is bent in proper form, and the runners are divided near their heels to receive the lower ends of the vertical members $A^2$ of the runner-frames, which runners are constructed in the usual manner and are attached to the forward frame A, so as to be in line with supporting and covering wheels.

To the front frame, immediately in rear of the arch-frame $A^2$, is secured a cross-bar P, which passes beneath the seedboxes L L and extends beyond the same, the ends of this cross-bar having connected thereto plates O O, which are centrally attached to the cross-bar P, the ends of the plate, which is maintained normally in a vertical position, having its ends shaped so as to partially overlie pulleys for the check-row cord, so as to maintain the cord in engagement with the pulley-sheaves. The plate has outwardly-extending lugs $o\ o$, perforated for the passage of the pulley-carrying bar R. To the plate O is pivoted a latch O', which is actuated in one direction by a spring and is moved against the action of the spring by a cord $o'$, which may extend toward the driver's seat, so that when the same is drawn upon the catch end of the latch will be moved out of engagement with a plate or catch carried by the bar R between the lugs $o\ o$, which project from the plate O and permit the rod R to turn and drop the check-row cord. To the plate O is pivoted a lever S, and to said lever the springs, which extend to the lower end of the latch O', are secured, the tendency of said springs being to hold the levers forwardly inclined, and one of the leaves $s$ at the forward end of the lever S is hinged to swing outward when pressure is exerted thereon to admit of the check-row cord freeing itself from the fork when the rod or bar R is released. The latch is held in engagement with the plate with such a pressure that the forked lever S may rock on its pivot without releasing the latch, and the greater the tension on the spring the more secure the latch will hold. The forked lever when thrown rearward by engagement with the usual stops or buttons on a check-row cord contacts with an arm or projecting portion on a drop-trigger T, which is attached to a rock-bar T', which is centrally provided with an offset, to which is secured a spring $t$, one end of the spring being attached to the tongue, so that the normal tendency of the drop-trigger will be raised above the bar O, which one end overlies. To the forward inturned ends of the triggers T T there are attached rods $t'$, which extend downward to seed drops or cut-offs $u$ at the lower ends of the seed-spouts, so that the grain which may have passed the first cut-off in the seedboxes will be dropped when the forward ends of the triggers are raised by the engagement therewith of the forked levers with the rear ends of the triggers.

By the construction shown as the machine moves forward the usual knots or buttons on the check-row cord engaging the forked levers move the same rearward, depress one end of the triggers, and actuate the lower seed cut-offs, and immediately after the seed has been dropped the forked levers are returned to a position to be engaged by the next knot or button on the check-row cord, and when the end of the field is reached by simply drawing upon the cord o' the latch will be released, which permits the pulley-carrying bar to turn in its supports to drop the check-row cord, and if said cord should hold in the arm of a fork the hinge will give and allow the cord to pass said arm, after which the arm will be returned by its spring to its normal position.

Having thus described my invention, what I claim as new, and desire to secure by Letters Patent, is—

1. In a check-row corn-planter the combination of curved frames pivotally connected to each other the front frame having an arched bar which extends above and below the same, runners connected to the front frame and to the lower ends of the vertical arched frame, means carried by the rear frame and connected to the front frame for changing the inclination of one of the frames with respect to the other said means including mechanism for shifting a sprocket-wheel on the supporting-axle substantially as shown and for the purpose set forth.

2. In a corn-planter the combination with the arched frames at right angles one to the other, runners connected thereto seedboxes and seed-dropping mechanism carried by said frame, of a rear frame pivotally attached to the front frame, said frame being constructed so that it is positioned normally below the plane of the horizontal member of the front frame to which it is pivoted, substantially as shown.

3. In a corn-planter the combination with the front and rear arched frames which are pivotally connected to each other the front frame carrying seedboxes and seed-dropping mechanism, said seed-dropping mechanism being actuated by gearing which extends from the rear frame, means for shifting the relative position of one frame with respect to the other, said means including a lever having a laterally-extended portion, a curved bar adapted to engage at one end with said laterally-extended portion the other end engaging a sleeve upon which is mounted a part of the driving mechanism substantially as shown whereby a single lever shifts the position of the frames and places out of gear the driving mechanism between the frames, substantially as shown.

4. In combination with the arched front and rear frames of a corn-planter, a foot-lever pivotally mounted on the rear frame, a link held in engagement with the forward end of the foot-lever and with the rear end of a tongue or pole which is attached to the front frame, a hand-lever connected with the foot-lever, said hand-lever having a pawl which engages a toothed segment to hold the foot in a locked position, a curved bar pivoted upon the main frame and adapted to be moved upon its pivot by engagement with the foot-lever one end of the curved bar engaging with a sliding sleeve which is operated thereby against the action of a spring substantially as shown and for the purpose set forth.

In testimony whereof I have hereunto set my hand in presence of two subscribing witnesses.

GEORGE R. McGINNIS.

Witnesses:
F. F. McMULLEN,
G. W. ELKINS.